(12) United States Patent
Jäger (10) Patent No.: US 10,537,943 B2
(45) Date of Patent: Jan. 21, 2020

(54) MODULAR ROTARY TOOL AND MODULAR TOOL SYSTEM

(71) Applicant: Kennametal Inc., Latrobe, PA (US)

(72) Inventor: Horst Manfred Jäger, Nürnberg (DE)

(73) Assignee: KENNAMETAL INC, Latrobe, PA (US)

( * ) Notice: Subject to any disclaimer, the term of this patent is extended or adjusted under 35 U.S.C. 154(b) by 0 days.

(21) Appl. No.: 15/937,262

(22) Filed: Mar. 27, 2018

(65) Prior Publication Data

US 2018/0272442 A1 Sep. 27, 2018

(30) Foreign Application Priority Data

Mar. 27, 2017 (DE) .................. 10 2017 205 166

(51) Int. Cl.
| | | |
|---|---|---|
| *B23B 51/06* | (2006.01) | |
| *B23B 51/02* | (2006.01) | |

(52) U.S. Cl.
CPC ............ *B23B 51/06* (2013.01); *B23B 51/02* (2013.01); *B23B 2251/02* (2013.01); *Y10T 408/45* (2015.01)

(58) Field of Classification Search
CPC ..... B23B 51/02; B23B 51/06; B23B 2251/02; Y10T 408/45; Y10T 408/455; Y10T 408/458

See application file for complete search history.

(56) References Cited

U.S. PATENT DOCUMENTS

| | | |
|---|---|---|
| 40,297 A | 10/1863 | Wakefield |
| 44,915 A | 11/1864 | Baker |
| 273,388 A | 3/1883 | Pratt |
| 329,660 A | 11/1885 | Lord |
| 658,216 A | 9/1900 | Munger |
| 690,093 A | 12/1901 | Beach |
| 2,289,583 A | 7/1942 | Malone |
| 3,410,749 A | 11/1968 | Chmiel |

(Continued)

FOREIGN PATENT DOCUMENTS

| | | |
|---|---|---|
| AT | 9431 B | 10/1902 |
| BR | PI04128702 | 8/2017 |

(Continued)

OTHER PUBLICATIONS

May 5, 2019 Foreign OA K-05995-CN-NP.

(Continued)

*Primary Examiner* — Eric A. Gates
*Assistant Examiner* — Chwen-Wei Su
(74) *Attorney, Agent, or Firm* — Ian K. Samways (57) ABSTRACT

The invention relates to a modular rotary tool, which extends along an axis of rotation (6) in the longitudinal direction and which has a carrier provided with flutes as well as a cutting head exchangeably secured on said carrier, wherein the carrier has on the end surface a coupling receiving means for receiving a coupling pin of the cutting head, wherein in the carrier, a coolant channel is formed, which terminates at a first outlet opening in the coupling receiving means, and wherein a branch channel is provided, which is spaced apart from the coupling receiving means and which opens into the coolant channel at one end and terminates at a second outlet opening in the flute at the other end.

13 Claims, 3 Drawing Sheets

(56) References Cited

U.S. PATENT DOCUMENTS

| | | |
|---|---|---|
| 3,434,553 A | 3/1969 | Weller |
| 3,765,496 A | 10/1973 | Flores |
| D262,219 S | 12/1981 | Lassiter |
| D263,598 S | 3/1982 | Lassiter |
| D273,387 S | 4/1984 | Lassiter |
| D273,389 S | 4/1984 | Lassiter |
| D273,390 S | 4/1984 | Lassiter |
| D273,391 S | 4/1984 | Lassiter |
| D273,682 S | 5/1984 | Lassiter |
| D274,436 S | 6/1984 | Lassiter |
| 5,346,335 A | 9/1994 | Harpaz |
| 5,382,121 A | 1/1995 | Bicknell |
| 5,429,199 A | 7/1995 | Sheirer |
| 5,509,761 A | 4/1996 | Grossman |
| 5,634,747 A | 6/1997 | Tukala |
| 5,769,577 A | 6/1998 | Boddy |
| 5,791,838 A | 8/1998 | Hamilton |
| 5,904,455 A | 5/1999 | Krenzer |
| 5,957,631 A | 9/1999 | Hecht |
| 5,988,953 A | 11/1999 | Berglund |
| 5,996,714 A | 12/1999 | Massa |
| 6,012,881 A | 1/2000 | Scheer |
| 6,045,301 A | 4/2000 | Kammermeier |
| 6,059,492 A | 5/2000 | Hecht |
| 6,109,841 A | 8/2000 | Johne |
| 6,123,488 A | 9/2000 | Kasperik |
| 6,210,083 B1 * | 4/2001 | Kammermeier ........ B23B 51/06 279/20 |
| 6,447,218 B1 | 9/2002 | Lagerberg |
| 6,481,938 B2 | 11/2002 | Widin |
| 6,485,235 B1 | 11/2002 | Mast |
| 6,506,003 B1 | 1/2003 | Erickson |
| 6,514,019 B1 | 2/2003 | Schulz |
| 6,524,034 B2 | 2/2003 | Eng |
| 6,530,728 B2 | 3/2003 | Eriksson |
| 6,582,164 B1 | 6/2003 | McCormick |
| 6,595,305 B1 | 7/2003 | Dunn |
| 6,595,727 B2 | 7/2003 | Arvidsson |
| 6,626,614 B2 | 9/2003 | Nakamura |
| 6,648,561 B2 | 11/2003 | Kraemer |
| 7,008,150 B2 | 3/2006 | Krenzer |
| 7,048,480 B2 | 5/2006 | Borschert |
| 7,070,367 B2 | 7/2006 | Krenzer |
| 7,101,125 B2 | 9/2006 | Borschert |
| 7,114,892 B2 | 10/2006 | Hansson |
| 7,125,207 B2 | 10/2006 | Craig |
| 7,134,816 B2 | 11/2006 | Brink |
| 7,189,437 B2 | 3/2007 | Kidd |
| 7,237,985 B2 | 7/2007 | Leuze |
| 7,306,410 B2 | 12/2007 | Borschert |
| 7,309,196 B2 | 12/2007 | de Souza |
| 7,311,480 B2 | 12/2007 | Heule |
| 7,360,974 B2 | 4/2008 | Borschert |
| 7,377,730 B2 | 5/2008 | Hecht |
| 7,407,350 B2 | 8/2008 | Hecht |
| 7,431,543 B2 | 10/2008 | Buettiker |
| 7,467,915 B2 | 12/2008 | de Souza |
| 7,476,067 B2 | 1/2009 | Borschert |
| 7,559,382 B2 | 7/2009 | Koch |
| 7,591,617 B2 | 9/2009 | Borschert |
| D607,024 S | 12/2009 | Dost |
| 7,625,161 B1 | 12/2009 | de Souza |
| 7,677,842 B2 | 3/2010 | Park |
| 7,740,472 B2 | 6/2010 | Delamarche |
| 7,775,751 B2 | 8/2010 | Hecht |
| 7,832,967 B2 | 11/2010 | Borschert |
| D632,320 S | 2/2011 | Chen |
| D633,534 S | 3/2011 | Chen |
| 7,972,094 B2 | 7/2011 | Men |
| RE42,644 E | 8/2011 | Jonsson |
| 7,997,832 B2 | 8/2011 | Prichard |
| 7,997,836 B2 * | 8/2011 | Kim .................... B23B 51/0009 407/40 |
| 8,007,207 B2 * | 8/2011 | Rimet ................ B23B 27/1685 407/101 |
| 8,007,208 B2 | 8/2011 | Noureddine |
| 8,021,088 B2 | 9/2011 | Hecht |
| 8,142,116 B2 | 3/2012 | Frejd |
| D668,697 S | 10/2012 | Hsu |
| D669,923 S | 10/2012 | Watson |
| 8,376,669 B2 | 2/2013 | Jaeger |
| 8,430,609 B2 | 4/2013 | Frejd |
| 8,449,227 B2 | 5/2013 | Danielsson |
| 8,534,966 B2 | 9/2013 | Hecht |
| 8,556,552 B2 | 10/2013 | Hecht |
| 8,596,935 B2 | 12/2013 | Fang |
| 8,678,722 B2 | 3/2014 | Aare |
| 8,678,723 B2 | 3/2014 | Osawa |
| 8,721,235 B2 | 5/2014 | Kretzschmann |
| D708,034 S | 7/2014 | Huang |
| 8,784,018 B2 | 7/2014 | Pabel |
| 8,784,019 B2 | 7/2014 | Paebel |
| D711,719 S | 8/2014 | DeBaker |
| 8,882,413 B2 | 11/2014 | Hecht |
| 8,931,982 B2 | 1/2015 | Osawa |
| 8,939,685 B2 * | 1/2015 | Cigni ........................ B23C 5/10 407/11 |
| 8,992,142 B2 | 3/2015 | Hecht |
| 9,028,180 B2 | 5/2015 | Hecht |
| 9,050,659 B2 | 6/2015 | Schwaegerl |
| 9,073,128 B2 | 7/2015 | Mack |
| 9,079,255 B2 | 7/2015 | Jager |
| 9,162,295 B2 | 10/2015 | Paebel |
| D742,714 S | 11/2015 | King, Jr. |
| D742,948 S | 11/2015 | Kenno |
| 9,180,650 B2 | 11/2015 | Fang |
| 9,205,498 B2 | 12/2015 | Jaeger |
| 9,248,512 B2 | 2/2016 | Aare |
| 9,296,049 B2 | 3/2016 | Schwaegerl |
| 9,302,332 B2 | 4/2016 | Scanlon |
| 9,371,701 B2 | 6/2016 | Cox |
| 9,481,040 B2 | 11/2016 | Schwaegerl |
| 9,498,829 B2 | 11/2016 | Zabrosky |
| D798,922 S | 10/2017 | Frota De Souza Filho |
| 10,213,845 B2 | 2/2019 | Schwagerl et al. |
| 2001/0033780 A1 | 10/2001 | Berglund |
| 2002/0159851 A1 | 10/2002 | Krenzer |
| 2002/0168239 A1 | 11/2002 | Mast |
| 2002/0195279 A1 | 12/2002 | Bise |
| 2003/0039523 A1 | 2/2003 | Kemmer |
| 2003/0091402 A1 | 5/2003 | Lindblom |
| 2004/0096281 A1 | 5/2004 | Sherman |
| 2004/0240949 A1 | 12/2004 | Pachao-Morbitzer |
| 2005/0084352 A1 | 4/2005 | Borschert |
| 2005/0135888 A1 | 6/2005 | Stokey |
| 2006/0171787 A1 | 8/2006 | Lindblom |
| 2006/0204345 A1 | 9/2006 | Borschert |
| 2006/0288820 A1 | 12/2006 | Mirchandani |
| 2008/0003072 A1 | 1/2008 | Kim |
| 2008/0175676 A1 | 7/2008 | Prichard |
| 2008/0175677 A1 | 7/2008 | Prichard |
| 2008/0181741 A1 | 7/2008 | Borschert |
| 2008/0193231 A1 | 8/2008 | Jonsson |
| 2008/0193237 A1 | 8/2008 | Men |
| 2009/0044986 A1 | 2/2009 | Jaeger |
| 2009/0067942 A1 | 3/2009 | Tanaka |
| 2009/0071723 A1 | 3/2009 | Mergenthaler |
| 2009/0116920 A1 | 5/2009 | Bae |
| 2009/0123244 A1 | 5/2009 | Buettiker |
| 2009/0311055 A1 | 12/2009 | Galota |
| 2009/0311060 A1 | 12/2009 | Frejd |
| 2010/0021253 A1 | 1/2010 | Frejd |
| 2010/0092259 A1 | 4/2010 | Borschert |
| 2010/0143059 A1 | 6/2010 | Hecht |
| 2010/0150673 A1 | 6/2010 | Schneider |
| 2010/0247255 A1 | 9/2010 | Nitzsche |
| 2010/0266357 A1 | 10/2010 | Kretzschmann |
| 2010/0272529 A1 | 10/2010 | Rozzi |
| 2010/0272531 A1 | 10/2010 | Shavit |
| 2010/0322723 A1 | 12/2010 | Danielsson |
| 2010/0322728 A1 | 12/2010 | Aare |
| 2010/0322729 A1 | 12/2010 | Päbel |
| 2010/0322731 A1 | 12/2010 | Aare |
| 2011/0020072 A1 | 1/2011 | Chen |

(56) References Cited

U.S. PATENT DOCUMENTS

| | | |
|---|---|---|
| 2011/0020073 A1 | 1/2011 | Chen |
| 2011/0020077 A1 | 1/2011 | Fouquer |
| 2011/0027021 A1 | 2/2011 | Nelson |
| 2011/0097168 A1 | 4/2011 | Jager |
| 2011/0110735 A1 | 5/2011 | Klettenheimer |
| 2011/0110739 A1 | 5/2011 | Frisendahl |
| 2011/0229277 A1 | 9/2011 | Hoffer |
| 2011/0236145 A1 | 9/2011 | Pabel |
| 2011/0268518 A1 | 11/2011 | Sampath |
| 2011/0299944 A1 | 12/2011 | Hafermann |
| 2011/0318128 A1 | 12/2011 | Schwagerl |
| 2012/0014760 A1 | 1/2012 | Glimpel |
| 2012/0082518 A1 | 4/2012 | Woodruff |
| 2012/0087746 A1 | 4/2012 | Fang |
| 2012/0087747 A1 | 4/2012 | Fang |
| 2012/0099937 A1 | 4/2012 | Osawa |
| 2012/0288337 A1* | 11/2012 | Sampath ............... B23B 51/02 408/57 |
| 2012/0308319 A1 | 12/2012 | Sampath |
| 2012/0315101 A1 | 12/2012 | Osawa |
| 2013/0183107 A1 | 7/2013 | Fang |
| 2013/0183112 A1 | 7/2013 | Schwagerl |
| 2013/0223943 A1 | 8/2013 | Gey |
| 2013/0259590 A1 | 10/2013 | Shaheen |
| 2013/0266389 A1 | 10/2013 | Hecht |
| 2013/0302101 A1 | 11/2013 | Scanlon |
| 2014/0023449 A1 | 1/2014 | Jonsson |
| 2014/0255115 A1 | 9/2014 | Zabrosky |
| 2014/0255116 A1 | 9/2014 | Myers |
| 2014/0260808 A1 | 9/2014 | Sweetman |
| 2014/0301799 A1 | 10/2014 | Schwaegerl |
| 2014/0321931 A1 | 10/2014 | Gey |
| 2014/0348602 A1 | 11/2014 | Schwaegerl |
| 2015/0063926 A1 | 3/2015 | Wu |
| 2015/0063931 A1 | 3/2015 | Wu |
| 2015/0104266 A1 | 4/2015 | Guter |
| 2015/0174671 A1 | 6/2015 | Maurer |
| 2015/0266107 A1 | 9/2015 | Gonen |
| 2015/0273597 A1 | 10/2015 | Aliaga |
| 2015/0298220 A1 | 10/2015 | Ach |
| 2015/0321267 A1 | 11/2015 | Takai |
| 2015/0328696 A1 | 11/2015 | Wang |
| 2015/0360302 A1* | 12/2015 | Guter ............... B23B 51/06 408/59 |
| 2016/0001379 A1 | 1/2016 | Kauper |
| 2016/0001381 A1 | 1/2016 | Lach |
| 2016/0016236 A1 | 1/2016 | Evans |
| 2016/0031016 A1 | 2/2016 | Takai |
| 2016/0059323 A1 | 3/2016 | Riester |
| 2016/0207122 A1 | 7/2016 | Chen |
| 2016/0229017 A1 | 8/2016 | Guy |
| 2016/0263663 A1 | 9/2016 | Schwaegerl |
| 2016/0263664 A1 | 9/2016 | Son |
| 2016/0263666 A1 | 9/2016 | Myers |
| 2016/0311035 A1 | 10/2016 | Peng |
| 2018/0133809 A1* | 5/2018 | Brunner ............... B23C 5/28 |

FOREIGN PATENT DOCUMENTS

| | | |
|---|---|---|
| CN | 1204976 A | 1/1999 |
| CN | 1258240 A | 6/2000 |
| CN | 2438535 | 7/2001 |
| CN | 1616170 A | 5/2005 |
| CN | 1689740 A | 11/2005 |
| CN | 101048251 A | 10/2007 |
| CN | 100455390 | 1/2009 |
| CN | 101605622 A | 12/2009 |
| CN | 102015171 A | 4/2011 |
| CN | 102307693 A | 1/2012 |
| CN | 102310214 A | 1/2012 |
| CN | 104203468 A | 12/2014 |
| CN | 104588739 A | 5/2015 |
| CN | 104759664 A | 7/2015 |
| CN | 204545517 | 8/2015 |
| DE | 94340 | 10/1897 |
| DE | 384720 | 11/1923 |
| DE | 3133488 A1 | 3/1983 |
| DE | 8303470 | 9/1983 |
| DE | 3314349 A1 | 10/1984 |
| DE | 3733298 | 4/1992 |
| DE | 19605157 | 9/1996 |
| DE | 29809638 | 8/1998 |
| DE | 102004022747 A1 | 11/2005 |
| DE | 102007044095 A1 | 3/2009 |
| DE | 102012200690 | 7/2013 |
| DE | 102012212146 A1 | 1/2014 |
| DE | 102013205889 | 5/2014 |
| DE | 102013209371 A1 | 11/2014 |
| DE | 102015106374 A1 | 10/2016 |
| EP | 599393 | 6/1994 |
| EP | 813459 | 7/2003 |
| EP | 1996358 | 11/2011 |
| EP | 2551046 A1 | 1/2013 |
| JP | 2002501441 A | 1/2002 |
| JP | 2002113606 A | 4/2002 |
| JP | 2003291044 A | 10/2003 |
| JP | 2004255533 A | 9/2004 |
| JP | 2005118940 | 5/2005 |
| JP | 2005169542 | 6/2005 |
| JP | 2006167871 A | 6/2006 |
| JP | 2008500195 A | 1/2008 |
| JP | 2011036977 A | 2/2011 |
| KR | 101014027 | 2/2011 |
| WO | WO1984003241 | 8/1984 |
| WO | WO9627469 | 9/1996 |
| WO | WO1998053943 | 12/1998 |
| WO | WO03031104 | 4/2003 |
| WO | WO2007107294 | 9/2007 |
| WO | WO2008072840 | 6/2008 |
| WO | WO2009128775 | 10/2009 |
| WO | WO2010102793 A1 | 9/2010 |
| WO | WO2015064904 A1 | 5/2015 |
| WO | WO-2015165872 A1 * | 11/2015 ............ B23B 51/06 |

OTHER PUBLICATIONS

Mar. 11, 2019 Foreign OA P15-06097-CN-NP.
Jul. 24, 2018 Foreign OA P16-06144-DE-NP.
Nov. 6, 2015 First office action K-04091-US-NP.
Sep. 13, 2018 Foreign OA K-04390-CN-PCT.
Jun. 13, 2019 Non-Final OA P17-06255-US-NP.

* cited by examiner

MODULAR ROTARY TOOL AND MODULAR TOOL SYSTEM

RELATED APPLICATION DATA

The present application claims priority pursuant to 35 U.S.C. § 119(a) to German Patent Application Number 102017205166.3 filed Mar. 27, 2017 which is incorporated herein by reference in its entirety.

FIELD

The invention relates to a modular rotary tool which extends in the longitudinal direction along an axis of rotation and which has a carrier provided with flutes as well as a cutting head exchangeably secured on said carrier.

BACKGROUND

Modular rotary tools of the aforementioned type, such as drills or drilling tools, extend in the longitudinal or axial direction along an axis of rotation and have two coupling parts, namely a carrier and a cutting head, wherein the cutting head is exchangeably secured on the carrier. For this purpose, the carrier usually has on its end surface two opposite securing webs, which are separated from each other by flutes and by which a pin receiving means or coupling receiving means is delimited. In the secured state, a coupling pin of the cutting head is inserted into this coupling receiving means. This is carried out, for example, by turning the cutting head about the axis of rotation relative to the carrier. During this bayonet-like turning, a clamping connection between the cutting head and the carrier is created so that the two coupling parts are held together in a clamping manner. In particular, no additional securing means, such as screws or the like, are provided therein.

From U.S. Pat. No. 7,360,974 B2 is known a rotary tool with a carrier and with a cutting head exchangeably secured on said carrier. The coupling connection in the secured state is in this case carried out by means of outer webs formed on the coupling pin. The webs have a helical course and are designed in the manner of a screw thread. When screwing in or turning the cutting head, the cutting head is axially tightened as a result.

US 2017/0028480 A1 discloses a rotary tool, which has an essentially cuboidal coupling pin (with the exception of any recesses due to grooves), which is designed with a web arranged on the end surface of the coupling pin and extending circumferentially, in order to prevent pulling-out in an axial direction. The web transitions into clamping and torque surfaces while forming a step. The step in this case forms a horizontal contact surface that acts as protection against pulling-out in an axial direction. The clamping surfaces are in this case formed by a radial cut-in.

In order to improve the service life of such rotary tools, it is, for example, possible to integrate into the carrier, cooling structures, such as coolant lines or coolant channels, which open into respective cooling structures of the cutting head or into a flute, for example, and guide a coolant and/or lubricant during operation.

In rotary tools with cutting heads with integrated cooling structures, the coolant channels of the carrier typically emerge at a bottom surface of the coupling receiving means and are aligned therewith corresponding coolant channels of the cutting head, which guide the coolant/lubricant along a cutting-head end surface or tool tip. In particular in applications or operating situations in which the end surface of the cutting head is free, i.e. does not have any material contact on the front side with a workpiece as, for example, in predrilled holes or cut-outs, the problem often occurs that the coolant/lubricant escapes at the cutting-head end surface and that the cutting head or the carrier is not wetted or cooled/lubricated. This disadvantageously reduces the service life of the rotary tool.

SUMMARY

The invention is based on the aim of specifying a particularly suitable modular rotary tool in which a reliable cooling is in particular ensured. The invention is furthermore based on the aim of specifying a suitable modular tool system.

With respect to the rotary tool, the aim is achieved with the features of claim 1. Advantageous embodiments and developments are the subject matter of the dependent claims.

The modular rotary tool is in particular designed as a drill for machining a workpiece. The rotary tool extends in this case in a longitudinal or axial direction along an axis of rotation and has a carrier provided with flutes as well as a cutting head exchangeably secured on said carrier. The carrier is provided on its end surface, in particular on a front or front-side end surface or carrier front, with a coupling receiving means for receiving a coupling pin of the cutting head.

Into the carrier, a cooling structure with at least one coolant channel is integrated, via which a coolant/lubricant transport takes place during operation. The line-like coolant channel terminates in a first outlet opening, which is arranged in the coupling receiving means of the carrier. The coolant channel in this case serves in particular to guide the coolant/lubricant in the carrier in a targeted and defined manner. Suitably, two coolant channels are in this case formed in the carrier, said coolant channels extending, for example, with the same helical pitch as the flutes.

Furthermore provided is a branch channel, which is spaced apart from the coupling receiving means and which opens into the coolant channel on the one hand and terminates at a second outlet opening in the flute on the other hand. In other words, a branch (branching point, bifurcation) is formed, which is spaced apart from the coupling receiving means and at which the flow path of the coolant/lubricant guided in the coolant channel is divided into two sub-paths. The sub-path formed by the end region of the coolant channel is hereinafter also called outlet section of the coolant channel.

In contrast to the prior art, the cooling structure of the carrier thus has two outlet openings, one end-surface or front-side first (front) outlet opening in the coupling receiving means and one approximately radially and/or azimuthally oriented second (lateral) outlet opening in the flute. A particularly suitable modular rotary tool is realized thereby.

As a result of the two outlet openings, a particularly flexible modular rotary tool is formed, which is improved in particular with respect to a use of different cutting heads. In this way, both cutting heads with integrated cooling structures, which fluidically interact with the first outlet opening in the coupling receiving means, and cutting heads without cooling structures, which essentially close the first outlet opening, can be used. As a result of the bifurcation or branching point, an automatic or self-actuating flow-through adjustment of a guided coolant/lubricant is in this case realized.

If the first outlet openings are not closed by the secured cutting head, the coolant/lubricant exits at both outlet openings. If the coolant/lubricant flow is prevented at the end surface by the cutting head, i.e. if the first outlet openings are closed or blocked by the cutting head, the coolant/lubricant only exits at the second outlet opening in the flute. In other words, the flow path of the coolant/lubricant can easily be changed by means of an exchange of the cutting head. This allows for a particularly suitable modular rotary tool, which is flexibly adaptable to different applications and situations by a simple exchange or replacement of the cutting head.

In other words, at least a portion of the coolant/lubricant always exits at the second outlet opening in the flute wall of the flute during operation. In particular in a large-area outlet opening, a chip being transported away, for example, can be very efficiently cooled thereby. The surface of the flute, i.e. the flute wall, is moreover efficiently cooled thereby.

The lateral or flute-side cooling of the carrier realized by the branch channel is in this case in particular advantageous in applications and operating situations in which the end surface of the cutting head is free, i.e. does not have any material contact on the front side with the workpiece. This is, for example, the case with a cut-out or a predrilled hole. In this case, the coolant/lubricant in cutting heads with integrated cooling structures exits at the end surface, wherein an effective wetting or cooling/lubrication of the cutting head or of the carrier does not take place. During operation, the branch channel in this case ensures that the region of the carrier that is in material contact is reliably supplied with coolant/lubricant. This benefits the service life of the carrier as well as the rotary tool.

The carrier is, for example, produced from a tool steel or a hard metal. Depending on the desired application, the or each cutting head is, for example, produced from a hard metal or, for example, produced as a pressed part using a sintered material.

The cutting head generally has, at its front end facing away from the carrier, major cutting edges, which are preferably connected to each other via a cross-cutting edge.

The cutting head is reversibly and exchangeably secured on the carrier, for example, by a simple turning or screwing-in by means of clamping as a result of a mechanical coupling of the coupling pin with the coupling receiving means. For this purpose, the cutting head is held in the secured state on the carrier in a form-fit or force-fit manner. In the course of the mechanical coupling, a protection against pulling-out in an axial direction is preferably provided, which prevents an undesired sliding of the coupling pin out of the coupling receiving means.

The protection against pulling-out is in this case formed, for example, by outer webs formed on the coupling pin, wherein the webs have a helical course in the manner of a screw thread, for example.

Also conceivable is, for example, a protection against pulling-out having an essentially cuboidal coupling pin, which is designed with a web arranged on the end surface of the coupling pin and extending circumferentially. The web transitions into clamping and torque surfaces while forming a step. The step in this case forms a horizontal contact surface that acts as protection against pulling-out in an axial direction. The clamping surfaces are in this case, for example, formed by a radial cut-in.

In an advantageous development, the branch channel is introduced into the flute as a bore. This ensures a particularly easy and cost-effective production of the modular rotary tool.

In a suitable embodiment, the branch channel extends obliquely to the coolant channel on an incline at an acute angle. An "acute angle" is to be understood as an angle of inclination in relation to the coolant channel of less than 90°, in particular less than 45°. The angle of inclination thus provides a change in the flow direction of the guided coolant/lubricant in relation to the (main) flow path formed by the coolant channel. During operation, the coolant/lubricant is guided in the coolant channel at a high pressure and thus at a high flow rate. The larger the (branch) angle between the coolant channel and the branch channel is, the less coolant/lubricant is branched off into the branch channel at the branching point when flowing past. In other words, the conveying capacity or the portion of the coolant/lubricant into the flute can be predetermined or adjusted by the angle.

In an advantageous embodiment, the second outlet opening of the branch channel is oriented toward a cutting edge of the secured cutting head. In other words, the second outlet opening is oriented in a targeted manner in the direction of the cutting edge of the cutting head. Realized thereby, even in a cutting head without cooling structures, is an efficient cooling and/or lubrication of the cutting head and, for example, a cooling of a chip to be transported away.

In a preferred development, the coolant channel has an outlet section with a reduced flow diameter in the region of the first outlet opening. In other words, the coolant channel has a larger flow diameter upstream of the branching point than downstream of the branching point. The outlet section is in this case preferably oriented coaxially or parallelly to the coolant channel extending upstream of the branching point. Since at least a portion of the coolant/lubricant is conveyed according to the present invention along the branch channel during operation, the conveyed fluid volume is reduced in the coolant channel downstream of the branching point. On the one hand, by reducing the flow diameter in the sub-path on the coolant channel side or in the outlet section, a certain flow rate or flow velocity of the guided coolant/lubricant is ensured. This means that an exit velocity of the coolant/lubricant from the first outlet opening can be predetermined or adjusted by means of the flow diameter of the outlet section. On the other hand, by reducing the flow diameter of the outlet section, a larger portion of the coolant/lubricant can be branched off into the branch channel.

In a preferred embodiment, the coolant channel, in particular its outlet section, and the branch channel have different flow diameters. By the relative dimensioning of the flow diameters of the coolant channel and of the branch channel, the portion of branched-off coolant/lubricant, i.e. the portion conveyed through the branch channel, can be easily predetermined or adjusted.

The portion of branched-off coolant/lubricant is preferably flexibly adapted to the respective application by dimensioning of the coolant channel and branch channel flow diameters and of the (branch) angle enclosed between the coolant channel and the branch channel. This ensures a particularly reliable and effective operation of the modular rotary tool.

In an advantageous embodiment, the coolant channel is guided in the carrier helically around the axis of rotation. The course of the coolant channel is in this case suitably adapted to the helical pitch of the flutes.

According to a first variant, a first type of cutting head is preferably secured on the carrier. In this type, the cutting head has a coolant hole, which is aligned in the secured state with the first outlet opening of the coolant channel. In other words, the cutting head of the first type has in particular an integrated cooling structure, preferably in the form of at least one coolant channel, which is fluidically coupled to the first outlet opening and terminates at the end surface of the cutting head. This ensures a reliable cooling and/or lubrication of the cutting head. The cutting head of the first type preferably has in particular two integrated coolant channels.

According to a second variant, a second type of cutting head is preferably secured on the carrier. In this second type, the cutting head does not have any integrated cooling structure; this means that the cutting head is designed without a coolant hole, wherein, in the secured state, the first outlet opening of the coolant channel is covered by the cutting head. In other words, the first outlet opening is closed or blocked in the secured state by the cutting head so that the coolant/lubricant is essentially only guided via the branch channel to the second outlet opening during operation.

The aim directed at the tool system is achieved according to the present invention by a modular tool system, for example, a modular drill system. This modular tool system has several different cutting heads, i.e. cutting heads of different types. The cutting heads can in this case be secured exchangeably and reversibly on a carrier provided with flutes. On its end surface, the carrier has a coupling receiving means for receiving a coupling pin of the cutting head. In the carrier, a coolant channel for conveying a coolant/lubricant is formed, which coolant channel terminates at a first outlet opening in the coupling receiving means. The carrier has a branch channel, which is spaced apart from the coupling receiving means and which opens into the coolant channel at one end and terminates at a second outlet opening in the flute at the other end. A particularly suitable modular tool system is thereby formed, which allows for a reliable cooling/lubrication of the carrier and, when required, a reliable cooling/lubrication of the cutting head.

In an advantageous embodiment, the modular tool system comprises a first type of cutting head, which has a coolant hole, which is aligned in the secured state with the first outlet opening of the coolant channel, and a second type of cutting head, which is designed without a coolant hole and, in the secured state, covers the first outlet opening of the coolant channel. As a result of the different and reversibly exchangeable cutting head types, the flow path of the coolant/lubricant guided during operation can be changed easily. This improves the flexibility of the modular tool system.

BRIEF DESCRIPTION OF THE DRAWINGS

Exemplary embodiments of the invention are explained in greater detail below in reference to a drawing. Shown therein are.

Parts and sizes corresponding to each other are always provided with the same reference symbols in all figures.

DETAILED DESCRIPTION

Figure 1:
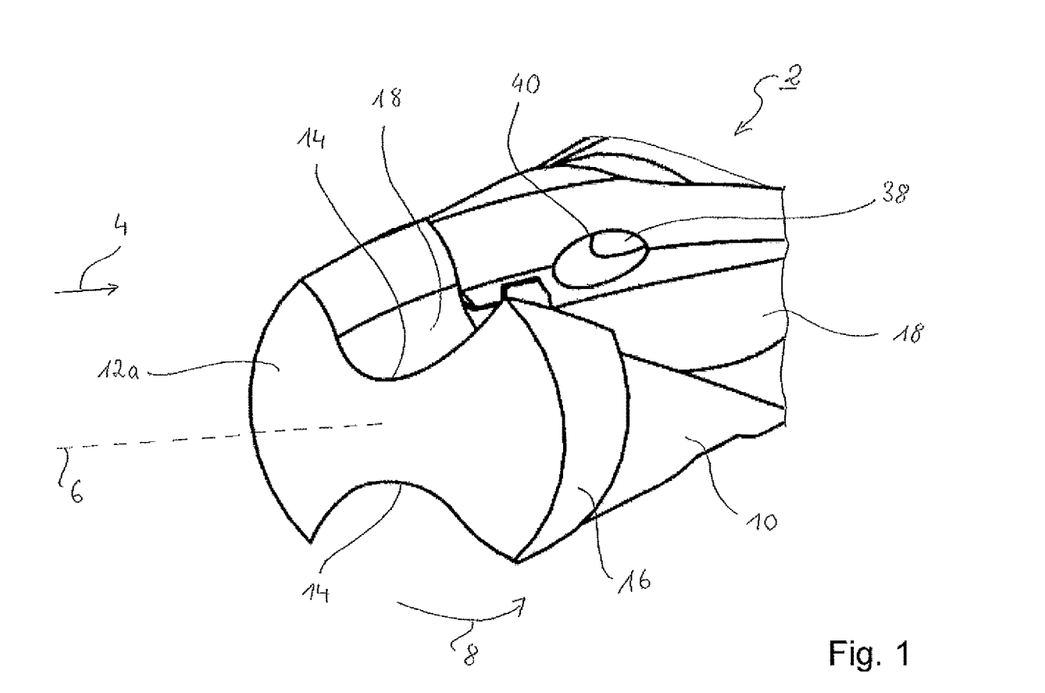
FIG. 1 a perspective view of a portion of a modular drilling tool of a modular tool system, with a cutting head and with a carrier, FIG. 2 a perspective view of a portion of the drilling tool in an exploded view with view toward the front side of the cutting head, FIG. 3 a projection view of a section through the drilling tool, FIG. 4 a perspective view of a portion of the drilling tool with an alternative cutting head, FIG. 5 a projection view of a section through the drilling tool with the alternative cutting head, and FIG. 6 a projection view of a section through the drilling tool with an alternative embodiment of the carrier.

The modular rotary tool 2 shown in FIG. 1 is, for example, a part of a module tool system not shown in more detail. The rotary tool 2 is formed in the embodiment shown in particular as a modular drilling tool. It extends in this case in a longitudinal or axial direction 4 along an axis of rotation 6. During normal operation, the rotary tool 2 rotates about the axis of rotation 6 in the direction of rotation, which at the same time defines a circumferential or azimuthal direction.

The rotary tool 2 has a carrier 10 as well as a cutting head 12a that can be exchangeably coupled to said carrier. The cutting head 12a, which is, for example, produced from a hard metal, has two (major) cutting edges 14, which are connected to each other in the center at a drill face via a cross-cutting edge (not described in more detail) and extend radially outwardly. Counter to the direction of rotation, end-surface major free spaces adjoin the cutting edges 14. On its circumferential side, the cutting head 12a has a rear 16, which is interrupted by opposite flutes 18.

The flutes 18 thus already start at the cutting head 12a and transition in the secured state into the carrier 10 and are guided further there. In the exemplary embodiment shown in FIGS. 1 to 3, the flutes 18 extend helically. The carrier 10 has a fluted shaft region. The fluted shaft region of the carrier 10 is adjoined by a non-fluted clamping section, which is not shown in greater detail and with which the rotary tool 2 is clamped into a machine tool.

Figure 2:
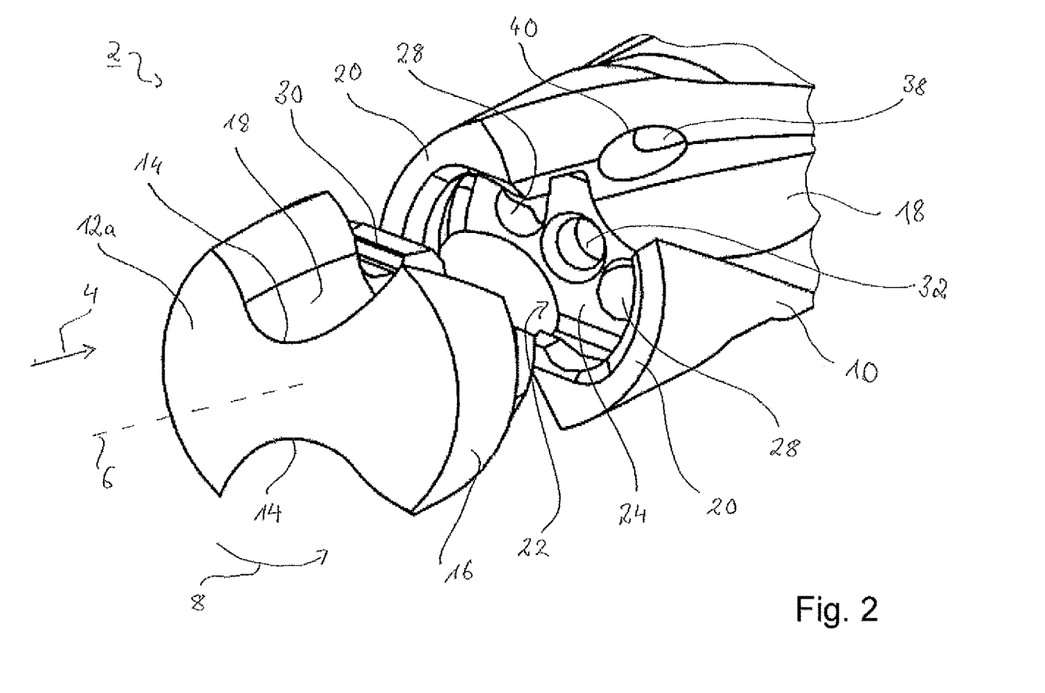
Figure 3:
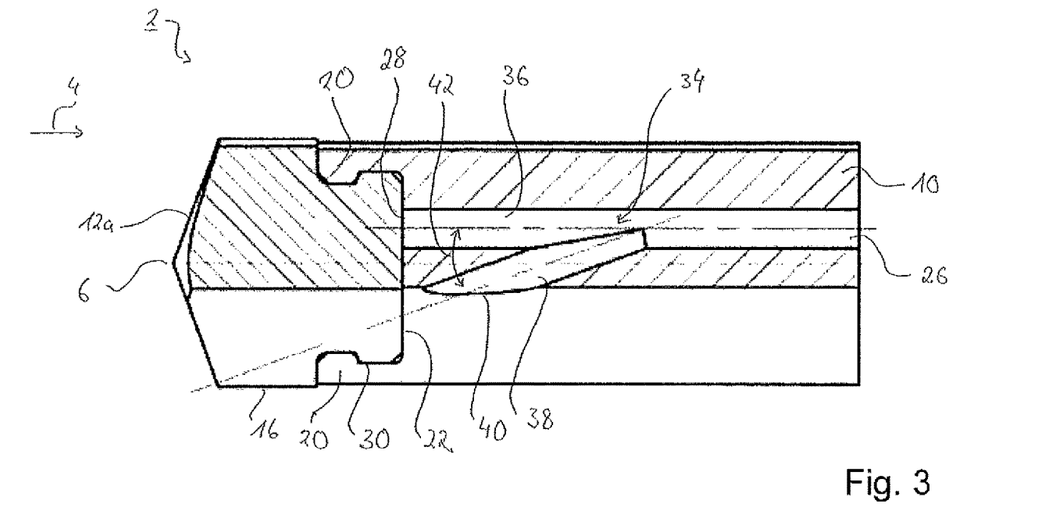

As can be seen in particular in FIG. 2 and in FIG. 3, the carrier 10 has on the end surface, i.e. on the front or front-end side, two approximately diagonally opposite securing webs 20, which are interrupted by flutes 18. The securing webs 20 delimit an end-surface coupling receiving means 22 of the carrier 10 (FIG. 2). The coupling receiving means 22 has a bottom surface 24, which is oriented horizontally, i.e. orthogonally to the axis of rotation 6.

Into the carrier 10, which is, for example, produced from tool steel, two coolant channels 26 extending spirally or helically around the axis of rotation 6 are integrated as cooling structure (FIG. 3), through which a coolant and/or lubricant is guided during operation. The coolant channels 26 extend along the longitudinal direction 4 in the carrier 10 and each open into an outlet opening 28 of the coupling receiving means 22 introduced into the bottom surface 24.

Corresponding to the coupling receiving means 22, the cutting head 12a has a coupling pin 30 extending in the longitudinal direction 4. The coupling pin 30 is radially set back from the circumferential surfaces of the rear 16. On the coupling pin 30 is formed, with respect to the axis of rotation 6, an axially upwardly extending insertion pin, which is not shown in more detail and which engages as a centering aid in a receiving means 32 of the coupling receiving means 22 in the course of a securing process, in which the cutting head 12a is secured to the carrier 10.

As shown in particular in the projection view of FIG. 3, the coolant channels 26 each have a branching point 34, which is arranged at an axial distance to the coupling receiving means 24 in the body of the carrier 10. At the branching point 34, the flow path of the coolant channel 26 branches off into a coaxially aligned outlet section 36 of the coolant channel 26 and a branch channel 38 extending obliquely thereto. The outlet section 36 of the coolant channel 26 terminates in the outlet opening 28 of the coupling receiving means 22. The branch channel 38 at one end opens into the coolant channel 26 and at the other end terminates in an outlet opening 40 in the flute 18.

The carrier 10 thus has two outlet openings 28 and 40 for each cooling structure formed by the coolant channel 26 and the branch channel 38. In addition to the end-surface or front-side outlet opening 28 in the coupling receiving means 22, a lateral second outlet opening 40 is thus provided in the wall of the flute 18.

As shown, for example, in FIG. 1, the flute-side outlet opening 40 of the branch channel 38 is oriented toward the cutting edge 14 of the secured cutting head 12a. In other words, the outlet opening 40 is oriented in a targeted manner in the direction of the cutting edge 14 of the cutting head 12a. This means that the coolant/lubricant exits the outlet opening 40 in the longitudinal direction 4 toward the cutting head 12a along the flute 18.

The branch channel 38 is in this case suitably introduced as a bore in the flute 18. As FIG. 3 shows comparatively clearly, the branch channel 38 extends obliquely to the coolant channel 26 on an incline at an acute (branch) angle 42. In the exemplary embodiment of FIG. 3, the angle 42 is less than 45°, in particular less than 30°. The angle 42 thus generates a change in the flow direction of the guided coolant/lubricant in relation to the (main) flow path formed by the coolant channel 26 and its outlet section 36.

In the exemplary embodiment shown in FIGS. 1, 2, and 3, the cutting head 12a does not have any integrated cooling structures. As can be seen in particular in FIG. 3, the cutting head 12a covers the outlet openings 28 of the coupling receiving means 22. In other words, the outlet openings 28 are closed or blocked by the coupling pin 30 of the cutting head 12a. As a result, the coolant/lubricant essentially only flows along the branch channel 38 to the outlet openings 40 during operation.

Figure 4:
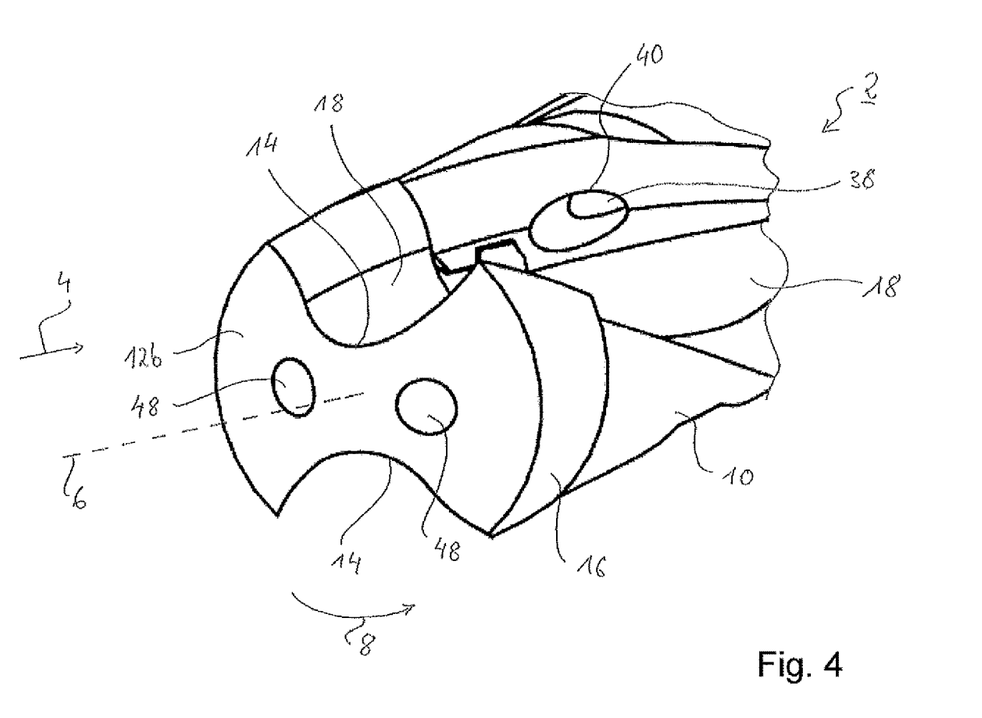
Figure 5:
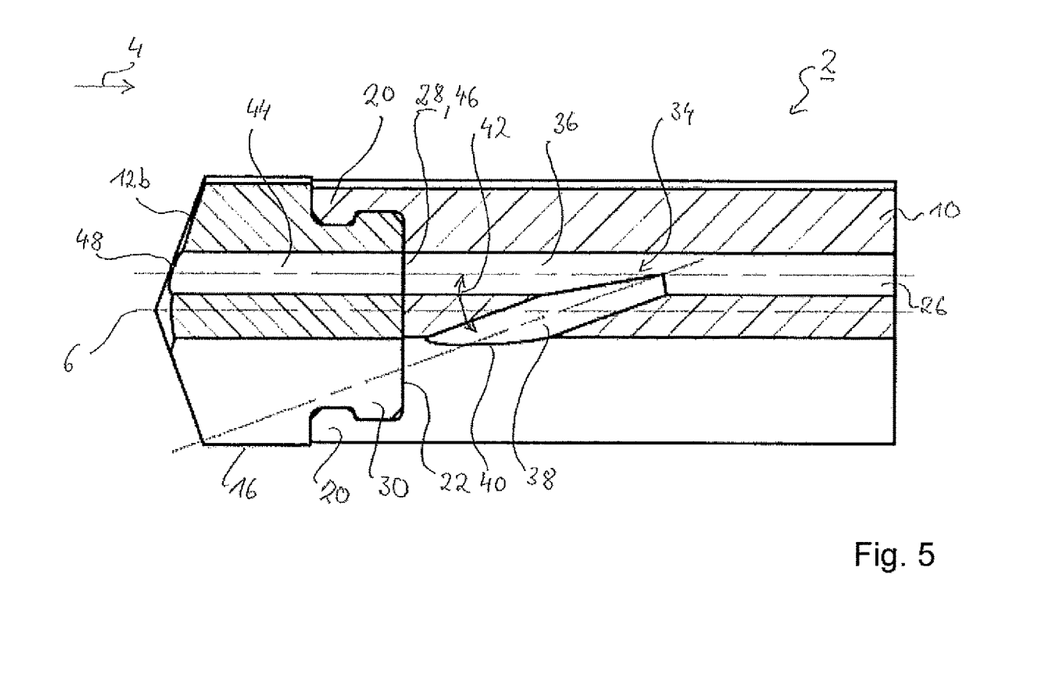

FIGS. 4 and 5 show the rotary tool 2 with a second type of cutting head 12b. The cutting head 12b in this case has two integrated coolant channels 44, each of which fluidically connects a coolant hole 46 in the coupling pin 30 to an outlet hole 48 in the region of a tool tip of the cutting head 12b.

Each of the coolant holes 46 of the cutting head 12b is arranged in the secured state so as to be respectively aligned with one of the outlet openings 28. In other words, as shown in particular in FIG. 5, an essentially continuous flow path is formed between the coolant channel 26 of the carrier 10 and the outlet hole 48. In other words, the coolant holes 46 of the cutting head 12b are fluidically coupled to the outlet openings 28 of the carrier 10.

In a secured state of the cutting head 12b, both outlet openings 28 and 40 in the coupling receiving means 22 and the flutes 18 are thus opened so that the coolant/lubricant exits during operation both on the end surface on the cutting head 12b and laterally in the flutes 18.

As a result of the two outlet openings 28 and 40 of the coolant channel 26 on the one hand and of the branch channel 38 on the other hand, a particularly flexible modular rotary tool 2 is provided in which an automatic or self-actuating flow-through adjustment of a guided coolant/lubricant is realized. In other words, the flow path of the coolant/lubricant can easily be changed by means of an exchange or change of the cutting head 12a, 12b. Since the branch channel 38 extends at an angle 42 obliquely to the main flow path of the coolant channel 26 or its outlet section 36, only a portion of the coolant/lubricant is guided into the branch channel 38 during operation. In particular, more than 50% of the coolant/lubricant guided in the coolant channel 26 exits at the outlet openings 28 or the outlet holes 48 during operation. In other words, the angle 42 is selected such that less than 50% of the coolant/lubricant is branched off at the branching point 34 to the outlet opening 40.

Figure 6:
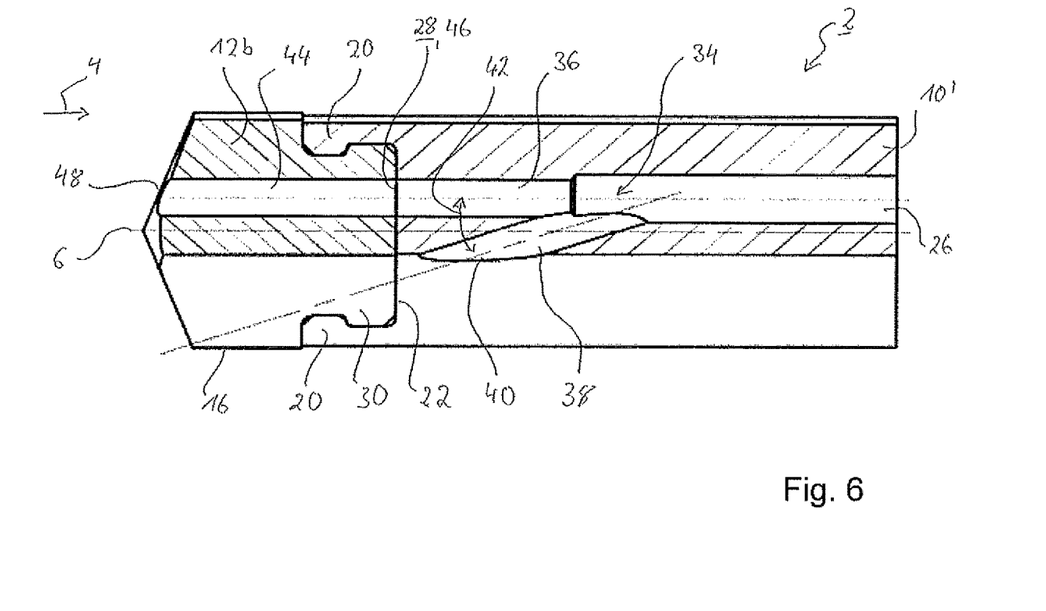

FIG. 6 shows an alternative embodiment of the carrier 10', in which the flow diameters of the coolant channel 26 and of the branch channel 38 are different. In particular, the outlet section 36 and the branch channel 38 have reduced flow diameters compared to the coolant channel 26 extending upstream of the branching point 34. At the branching point 34, a narrowing toward the outlet section 36 is thus formed along the main flow path, whereby more coolant/lubricant is fed into the branch channel 38 during operation than in the previously described embodiment.

The invention is not limited to the previously described exemplary embodiments. Rather, other variants of the invention may also be derived therefrom by the person skilled in the art, without leaving the subject matter of the invention. In particular, all individual features described in connection with the exemplary embodiments can also be combined with each other in another way, without leaving the subject matter of the invention.

The invention claimed is:

1. A modular rotary tool, which extends along an axis of rotation in the longitudinal direction, said modular rotary tool comprising:
   a carrier which includes flutes, and
   a cutting head which is exchangeably secured on the carrier and includes a coupling pin,
   wherein the carrier comprises an end surface and, disposed at the end surface, a coupling receiving means for receiving the coupling pin of the cutting head,
   wherein the carrier further includes:
      a coolant channel formed therein, the coolant channel terminating at a first outlet opening disposed in the coupling receiving means, and
      a branch channel spaced apart from the coupling receiving means,
      wherein the branch channel, at one end thereof, opens into the coolant channel and, at another end thereof, terminates at a second outlet opening disposed in one of the flutes, and
   wherein the second outlet opening permits a flow of coolant/lubricant toward a cutting edge of the secured cutting head if the first outlet opening is blocked by the secured cutting head.

2. The modular rotary tool according to claim 1, wherein the branch channel comprises a bore introduced into the flute.

3. The modular rotary tool according to claim 1, wherein the branch channel extends obliquely to the coolant channel on an incline at an acute angle.

4. The modular rotary tool according to claim 1, wherein the second outlet opening of the branch channel is oriented toward a cutting edge of the secured cutting head.

5. The modular rotary tool according to claim 1, wherein the coolant channel has an outlet section with a reduced flow diameter in the region of the first outlet opening.

6. The modular rotary tool according to claim 1, wherein the coolant channel and the branch channel have different flow diameters.

7. The modular rotary tool according to claim 1, wherein the coolant channel is guided in the carrier helically around the axis of rotation.

8. The modular rotary tool according to claim 1, wherein the cutting head has a coolant hole, which is aligned in the secured state with the first outlet opening of the coolant channel.

9. The modular rotary tool according to claim 1, wherein the cutting head is designed without a coolant hole and, in the secured state, covers the first outlet opening of the coolant channel.

10. The modular tool system according to claim 1, wherein the second outlet opening permits a flow of coolant/ lubricant toward the cutting edge of the secured cutting head if the first outlet opening is blocked by the coupling pin of the secured cutting head.

11. A modular tool system comprising:
   a plurality of cutting heads, and
   a carrier which includes flutes,
   wherein each of the cutting heads:
      is exchangeably securable on the carrier, and
      includes a coupling pin,
   wherein the carrier comprises an end surface and, disposed at the end surface, a coupling receiving means for receiving the coupling pin of each of the cutting heads,
   wherein the carrier further includes:
      a coolant channel formed therein, the coolant channel terminating at a first outlet opening disposed in the coupling receiving means, and
      a branch channel spaced apart from the coupling receiving means,
      wherein the branch channel, at one end thereof, opens into the coolant channel and, at another end thereof, terminates at a second outlet opening disposed in one of the flutes, and
   wherein the second outlet opening permits a flow of coolant/lubricant toward a cutting edge of a secured one of the cutting heads if the first outlet opening is blocked by the secured one of the cutting heads.

12. The modular tool system according to claim 11, wherein the cutting heads include:
   a first type of cutting head, which has a coolant hole that is aligned in the secured state with the first outlet opening of the coolant channel, and
   a second type of cutting head, which is designed without a coolant hole and, in the secured state, blocks the first outlet opening of the coolant channel.

13. The modular tool system according to claim 11, wherein the second outlet opening permits a flow of coolant/lubricant toward the cutting edge of the secured one of the cutting heads if the first outlet opening is blocked by the coupling pin of the secured one of the cutting heads.

* * * * *